US 8,297,042 B2

(12) United States Patent
Asanuma et al.

(10) Patent No.: US 8,297,042 B2
(45) Date of Patent: Oct. 30, 2012

(54) EXHAUST PURIFICATION DEVICE OF INTERNAL COMBUSTION ENGINE

(75) Inventors: Takamitsu Asanuma, Mishima (JP); Shinya Hirota, Susono (JP); Kohei Yoshida, Gotenba (JP); Hiromasa Nishioka, Susono (JP); Hiroshi Otsuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 124 days.

(21) Appl. No.: 12/674,627

(22) PCT Filed: Jan. 27, 2009

(86) PCT No.: PCT/JP2009/051677
§ 371 (c)(1),
(2), (4) Date: Mar. 10, 2010

(87) PCT Pub. No.: WO2009/096575
PCT Pub. Date: Aug. 6, 2009

(65) Prior Publication Data
US 2011/0113757 A1     May 19, 2011

(30) Foreign Application Priority Data

Jan. 30, 2008   (JP) .................................. 2008-019321

(51) Int. Cl.
*F01N 11/00*   (2006.01)
*F01N 3/18*    (2006.01)
(52) U.S. Cl. ............................... 60/285; 60/277; 60/283
(58) Field of Classification Search ................... 60/277, 60/283
See application file for complete search history.

(56) References Cited

U.S. PATENT DOCUMENTS

| 6,230,487 | B1 * | 5/2001 | Blumenstock et al. ......... 60/286 |
| 6,318,073 | B1 * | 11/2001 | Boegner et al. ................. 60/274 |
| 2002/0079236 | A1 * | 6/2002 | Hurland et al. ............. 205/786.5 |
| 2002/0136936 | A1 * | 9/2002 | Grieve et al. .................... 429/17 |
| 2007/0034551 | A1 * | 2/2007 | Lindstrom et al. ........ 208/208 R |
| 2009/0044518 | A1 * | 2/2009 | Frouvelle et al. ............... 60/286 |
| 2009/0241638 | A1 * | 10/2009 | Asanuma et al. ............ 73/28.04 |

FOREIGN PATENT DOCUMENTS

JP       A 2000-320322       11/2000
(Continued)

OTHER PUBLICATIONS

International Search Report issued in corresponding International Application No. PCT/JP2009/051677, mailed Apr. 28, 2009 (with English-language translation).

*Primary Examiner* — Kenneth Bomberg
*Assistant Examiner* — Brandon Lee
(74) *Attorney, Agent, or Firm* — Oliff & Berridge, PLC

(57) ABSTRACT

In an exhaust purification system of an internal combustion engine comprising an exhaust purification device which receives a bad influence from $SO_X$ in the exhaust gas and a S trap device arranged upstream of the exhaust purification device, which can store $SO_X$ in the exhaust gas, an amount of $SO_X$ passing through the S trap device is integrated as an integrated value, each allowance value of the integrated value for each elapsed period from the start time of the use of the S trap device is set, and when the current integrated value exceeds the corresponding allowance value and between a first set period ago and the current time, fuel has been supplied into the fuel tank and engine oil has not been exchanged, it is determined that fuel with a high concentration of sulfur has been supplied into the fuel tank.

8 Claims, 3 Drawing Sheets

FOREIGN PATENT DOCUMENTS

| | | |
|---|---|---|
| JP | A 2001-074727 | 3/2001 |
| JP | A 2001-280179 | 10/2001 |
| JP | A 2003-148136 | 5/2003 |
| JP | A 2003-148137 | 5/2003 |
| JP | A 2005-036653 | 2/2005 |
| JP | A 2005-344619 | 12/2005 |
| WO | WO2009008396 A1 * | 1/2009 |

* cited by examiner

→ TIME

EXHAUST PURIFICATION DEVICE OF INTERNAL COMBUSTION ENGINE

TECHNICAL FIELD

The present invention relates to an exhaust purification system of an internal combustion engine.

BACKGROUND ART

In the marketplace, there is bad fuel with a high concentration of sulfur. If it is detected that such fuel has been supplied into the fuel tank, the fuel can be removed therefrom in case of need. The exhaust gas of the fuel with a high concentration of sulfur includes a relatively large amount of $SO_X$. $SO_X$ temporarily deteriorates a three way catalyst. Accordingly, it is suggested that an $O_2$ storage ability of a three way catalyst device before and after the fuel supply is estimated on the basis of the outputs of an $O_2$ sensor arranged downstream of the three way catalyst device. It is determined that the fuel with a high concentration of sulfur has been supplied when the O2 storage ability has dropped to some degree (for example, refer to Japanese Unexamined Patent Publication Nos. 2003-148137, 2001-74727, 2005-344619, and 2000-320322).

DISCLOSURE OF THE INVENTION

Incidentally, because the exhaust gas of an internal combustion engine which performs lean combustion, such as in a diesel engine or a direct-fuel injection type spark-ignition engine includes a relative large amount of $NO_X$, to decrease an amount of $NO_X$ discharged into the atmosphere, a $NO_X$ storage catalyst, which satisfactorily stores $NO_X$ in the exhaust gas when the air-fuel ratio of the exhaust gas is lean, is usually carried on a catalyst device or a particulate filter arranged in the exhaust passage. However, such a catalyst device or a particulate filter cannot store $NO_X$ without limitation. Therefore, it is necessary as a regeneration treatment that the air-fuel ratio of the exhaust gas is made the stoichiometric air-fuel ratio or a rich air-fuel ratio to release the stored $NO_X$ and to reduce the released $NO_X$ when $NO_X$ is stored more than a set amount.

The $NO_X$ storage catalyst also stores $SO_X$ in the exhaust gas and the stored $SO_X$ cannot be released in the regeneration treatment. Accordingly, when the catalyst device or the particulate filter stores a large amount of $SO_X$, it cannot sufficiently store $NO_X$ (sulfur contamination). Therefore, in case that such an exhaust gas purification device which receives a bad influence from $SO_X$ in the exhaust gas is arranged in the exhaust passage, the exhaust gas flowing into the exhaust gas purification device must not include a large amount of $SO_X$, and therefore it is suggested that a S trap device which can store $SO_X$ in the exhaust gas be arranged upstream of the exhaust gas purification device.

However, even if the S trap device is merely arranged upstream of the exhaust purification device, when the fuel with a high concentration of sulfur has been supplied into the fuel tank so that the concentration of $SO_X$ in the exhaust gas is high, a relatively large amount of $SO_X$ passes through the S trap device, and therefore the exhaust gas purification device may receive a bad influence from $SO_X$. If it is determined that the fuel with a high concentration of sulfur has been supplied into the fuel tank by using of the above art, the fuel can be removed therefrom or the same fuel will not be supplied again so that it can be restrained that the exhaust purification device receives a bad influence from $SO_X$.

However, when the fuel with a high concentration of sulfur has not only been supplied into the fuel tank, but when engine oil with a high concentration of sulfur is also used, the concentration of $SO_X$ in the exhaust gas is high and therefore a relatively large amount of $SO_X$ passes through the S trap device and the exhaust gas purification device may receive a bad influence from $SO_X$. In this case, it is meaningless to remove the fuel from the fuel tank. Accordingly, even if it is determined that only fuel with a high concentration of sulfur has been supplied into the fuel tank, the S trap device cannot sufficiently restrain that the exhaust purification device receives a bad influence from $SO_X$. Therefore, it is necessary to determine if the cause of a relatively large amount of $SO_X$ passing through the S trap device is the supplied fuel with a high concentration of sulfur.

Accordingly, an object of the present invention is to provide an exhaust purification system of an internal combustion engine comprising an exhaust purification device and a S trap device arranged upstream thereof, in which it can be determined if a cause of a relatively large amount of $SO_X$ passing through the S trap device is the supplied fuel with a high concentration of sulfur.

An exhaust purification system of an internal combustion engine as set forth in claim 1 of the present invention, comprising an exhaust purification device which receives a bad influence from $SO_X$ in the exhaust gas and a S trap device arranged upstream of the exhaust purification device, which can store $SO_X$ in the exhaust gas, is provided, characterized in that an amount of $SO_X$ passing through the S trap device is integrated as an integrated value, each allowance value of the integrated value for each elapsed period from the start time of the use of the S trap device is set, and when the current integrated value exceeds the corresponding allowance value and between a first set period ago and the current time, fuel has been supplied into the fuel tank and engine oil has not been exchanged, it is determined that fuel with a high concentration of sulfur has been supplied into the fuel tank.

An exhaust purification system of an internal combustion engine as set forth in claim 2 of the present invention is provided as the exhaust purification system of an internal combustion engine as set forth in claim 1 characterized in that when the current integrated value exceeds the corresponding allowance value and between the first set period ago and the current time, fuel has not been supplied into the fuel tank and engine oil has been exchanged, it is determined that engine oil with a high concentration of sulfur has been used.

An exhaust purification system of an internal combustion engine as set forth in claim 3 of the present invention is provided as the exhaust purification system of an internal combustion engine as set forth in claim 1 or 2 characterized in that when the current integrated value exceeds the corresponding allowance value and between the first set period ago and the current time, fuel has been supplied into the fuel tank and engine oil has been exchanged, fuel with a low concentration of sulfur is supplied into the fuel tank at the next time, if an increase amount of the integrated value per a unit time after the fuel supply at the next time decreases under that before the fuel supply at the next time, it is determined that the fuel with a high concentration of sulfur has been supplied into the fuel tank at the previous time, and if the increase amount of the integrated value per a unit time after the fuel supply at the next time does not decrease under that before the fuel supply at the next time, it is determined that the engine oil with a high concentration of sulfur has been used.

An exhaust purification system of an internal combustion engine as set forth in claim 4 of the present invention is provided as the exhaust purification system of an internal combustion engine as set forth in any one of claims 1-3 characterized in that when the current integrated value exceeds the corresponding allowance value and between the first set period ago and the current time, fuel has not been supplied into the fuel tank and engine oil has not been exchanged, if an increase amount of the integrated value per a unit time at a time when a second set period elapses from the current time decreases under that at the current time, it is determined that the $SO_X$ stored in the S trap device has been temporarily released therefrom, and if the increase amount of the integrated value per a unit time at the time when the second set period elapses from the current time does not decrease under that at the current time, it is determined that a sensor for detecting an amount of $SO_X$ passing through the S trap device is abnormal.

An exhaust purification system of an internal combustion engine as set forth in claim 5 of the present invention is provided as the exhaust purification system of an internal combustion engine as set forth in any one of claims 1-4 characterized in that the S trap device is exchanged when it stores an amount of $SO_X$ larger than a set amount.

According to the exhaust purification system of an internal combustion engine as set forth in claim 1 of the present invention, an amount of $SO_X$ passing through the S trap device is integrated as an integrated value, each allowance value of the integrated value for each elapsed period from the start time of the use of the S trap device is set, and when the current integrated value exceeds the corresponding allowance value and between a first set period ago and the current time, fuel has been supplied into the fuel tank and engine oil has not been exchanged, it is determined that fuel with a high concentration of sulfur has been supplied into the fuel tank. Therefore, in this case, the fuel with a high concentration of sulfur can be removed from the fuel tank or the like, if necessary.

According to the exhaust purification system of the internal combustion engine as set forth in claim 2 of the present invention, in the exhaust purification system of an internal combustion engine as set forth in claim 1, when the current integrated value exceeds the corresponding allowance value and between the first set period ago and the current time, fuel has not been supplied into the fuel tank and engine oil has been exchanged, it is determined that engine oil with a high concentration of sulfur has been used. Therefore, in this case, it is meaningless to remove the fuel from the fuel tank. The engine oil can be exchanged or the like, if necessary.

According to the exhaust purification system of an internal combustion engine as set forth in claim 3 of the present invention, in the exhaust purification system of an internal combustion engine as set forth in claim 1 or 2, when the current integrated value exceeds the corresponding allowance value and between the first set period ago and the current time, fuel has been supplied into the fuel tank and engine oil has been exchanged, fuel which include a low concentration of sulfur is supplied into the fuel tank at the next time. The same engine oil is used before and after the fuel supply at the next time. Accordingly, if an increase amount of the integrated value per a unit time after the fuel supply at the next time decreases under that before the fuel supply at the next time, the concentration of sulfur of the fuel in the fuel tank drops by the fuel supply so that it is determined that the fuel with a high concentration of sulfur has been supplied into the fuel tank at the previous time. Therefore, the fuel can be removed from the fuel tank or the like, if necessary. On the other hand, if the increase amount of the integrated value per a unit time after the fuel supply at the next time does not decrease under that before the fuel supply at the next time, the concentration of sulfur in the fuel tank does not change in spite of the supply of the fuel with a low concentration of sulfur so that it is determined that the engine oil with a high concentration of sulfur has been used. Therefore, the engine oil can be exchanged or the like, if necessary.

According to the exhaust purification system of an internal combustion engine as set forth in claim 4 of the present invention, in the exhaust purification system of an internal combustion engine as set forth in any one of claims 1 to 3, when the current integrated value exceeds the corresponding allowance value and between the first set period ago and the current time, fuel has not been supplied into the fuel tank and engine oil has not been exchanged, the fuel with a high concentration of sulfur has not been supplied and the engine oil with a high concentration of sulfur has not been used. Accordingly, if an increase amount of the integrated value per a unit time at a time when a second set period elapses from the current time decreases under that at the current time, it is determined that the $SO_X$ stored in the S trap device has been temporarily released therefrom. Therefore, no special treatment is needed. On the other hand, if the increase amount of the integrated value per a unit time at the time when the second set period elapses from the current time does not decrease under that at the current time, it is determined that a sensor for detecting an amount of $SO_X$ passing through the S trap device is abnormal. Therefore, the sensor can be exchanged or the like, if necessary.

Accordingly to the exhaust purification system of an internal combustion engine as set forth in claim 5 of the present invention, in the exhaust purification system of the internal combustion engine as set forth in any one of claims 1-4, the S trap device is exchanged when it stores an amount of $SO_X$ larger than a set amount. Therefore, as a regeneration treatment, the S trap device does not need to release $SO_X$, which gives a bad influence to the exhaust purification device.

BEST MODE FOR CARRYING OUT THE INVENTION

Figure 1:
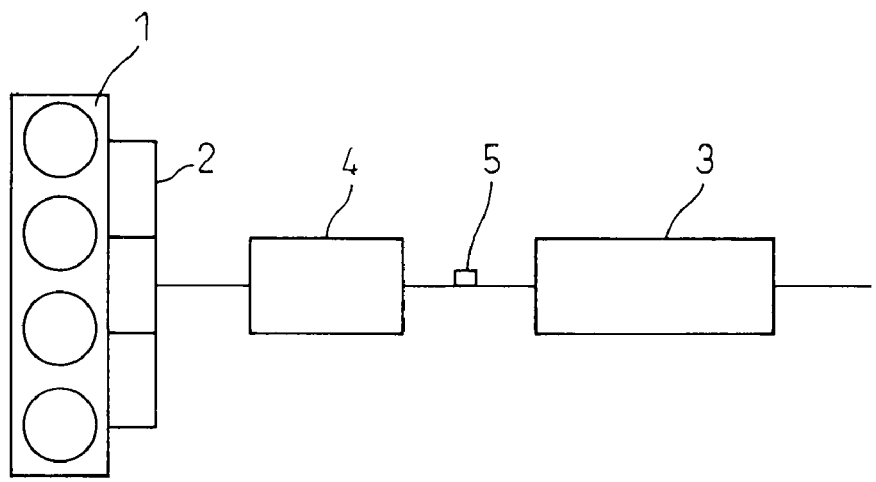
FIG. 1 is a schematic view showing an embodiment of the exhaust purification system of an internal combustion engine according to the present invention.

FIG. 1 is a schematic view showing an embodiment of the exhaust purification system of an internal combustion engine according to the present invention. In FIG. 1, reference numeral 1 is an internal combustion engine which performs lean combustion such as in a diesel engine or a direct fuel injection-type spark-ignition engine.

Reference numeral 2 is an exhaust manifold of the engine 1. The exhaust gas of such an engine 1 includes a relatively large amount of $NO_X$ so that a $NO_X$ storing/reducing catalyst device 2 for purifying $NO_X$ is arranged in the exhaust passage.

A $NO_X$ storage catalyst carried on the $NO_X$ storing/reducing catalyst device 3 satisfactorily stores $NO_X$ in the exhaust gas when the air-fuel ratio of the exhaust gas is lean, and releases the stored $NO_X$ when the air-fuel ratio of the exhaust gas is stoichiometric or rich. The $NO_X$ storing/reducing catalyst device 3 cannot store $NO_X$ without limitation. Periodically or when a set amount of $NO_X$ is stored, a regeneration treatment in which the air-fuel ratio of the exhaust gas is changed to a rich air-fuel ratio is carried out to release $NO_X$ stored in the $NO_X$ storing/reducing catalyst device 3 and to purify the released $NO_X$ by reducing materials in the exhaust gas.

In place of or in addition to the $NO_X$ storing/reducing catalyst device, the $NO_X$ storage catalyst may be carried on a particulate filter arranged in the exhaust passage. The particulate filter can not only trap particulates but can also store $NO_X$ in the exhaust gas. The $NO_X$ storage catalyst is at least one element selected from for example potassium K, sodium Na, lithium Li, cesium Cs, or another alkali metal, barium Ba, calcium Ca, or another alkali earth metal, and lanthanum La, yttrium Y, or another rare earth. The $NO_X$ storage catalyst releases active oxygen when it stores and releases $NO_X$ and the active oxygen can oxidize and remove the particulates without producing luminous.

Once the $NO_X$ storing/reducing catalyst device 3 (or the particulate filter) stores $SO_X$ in the exhaust gas, the stored $SO_X$ cannot be released by the regeneration treatment so that an amount of $NO_X$ that can be stored drops (sulfur contamination). Therefore, an S trap device 4 which can store $SO_X$ in the exhaust gas is arranged upstream of the $NO_X$ storing/reducing catalyst device 3 in the exhaust passage to restrain the sulfur contamination of the $NO_X$ storing/reducing catalyst device 3.

However, if the S trap device is merely arranged, the sulfur contamination of the $NO_X$ storing/reducing catalyst device 3 cannot sufficiently be restrained. It is necessary to observe $SO_X$ passing through the S trap device 4. For the purpose, a $SO_X$ sensor 5 which detects an amount of $SO_X$ in the exhaust gas is arranged between the S trap device 4 and the $NO_X$ storing/reducing catalyst device 3. When the $SO_X$ sensor detects a concentration of $SO_X$, an amount of $SO_X$ per a unit time can be calculated on the basis of an amount of the exhaust gas per a unit time. The $SO_X$ sensor 5 may be one which detects an amount of $SO_X$ in the exhaust gas by means of utilization of a change of physical property when nitrate changes sulfate therein.

Figure 2:
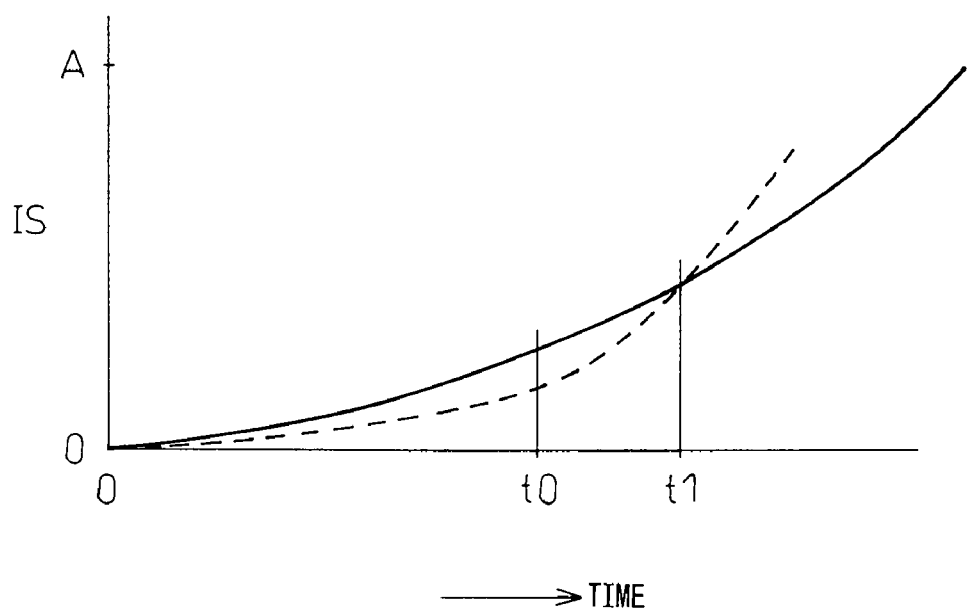
FIG. 2 is a time chart showing the changes of the integrated value of an amount of $SO_X$ passing through the S trap device and of an allowance value of the integrated value.

In the present embodiment, an amount of $SO_X$ passing through the S trap device 4 is integrated as an integrated value (IS) from the start time of the use of the S trap device 4 and the S trap is exchanged when the integrated value (IS) reaches a set value (A). In FIG. 2, a solid line shows an allowance value of the integrated value for an elapsed period from the start time of the use of the S trap device 4. Each allowance value corresponds to each integrated value which integrates amounts of $SO_X$ passing through the S trap device during each elapsed period from the start time of the use of the S trap device when a usual fuel with a low concentration of sulfur has been supplied into the fuel tank, a usual engine oil with a low concentration of sulfur has been used, and an allowed maximum amount of fuel has been injected. Thus, it is possible for the integrated value of the amounts of $SO_X$ for each elapsed period to become the corresponding allowance value. However, when the integrated value exceeds the corresponding allowance value, there is a cause.

Figure 3:
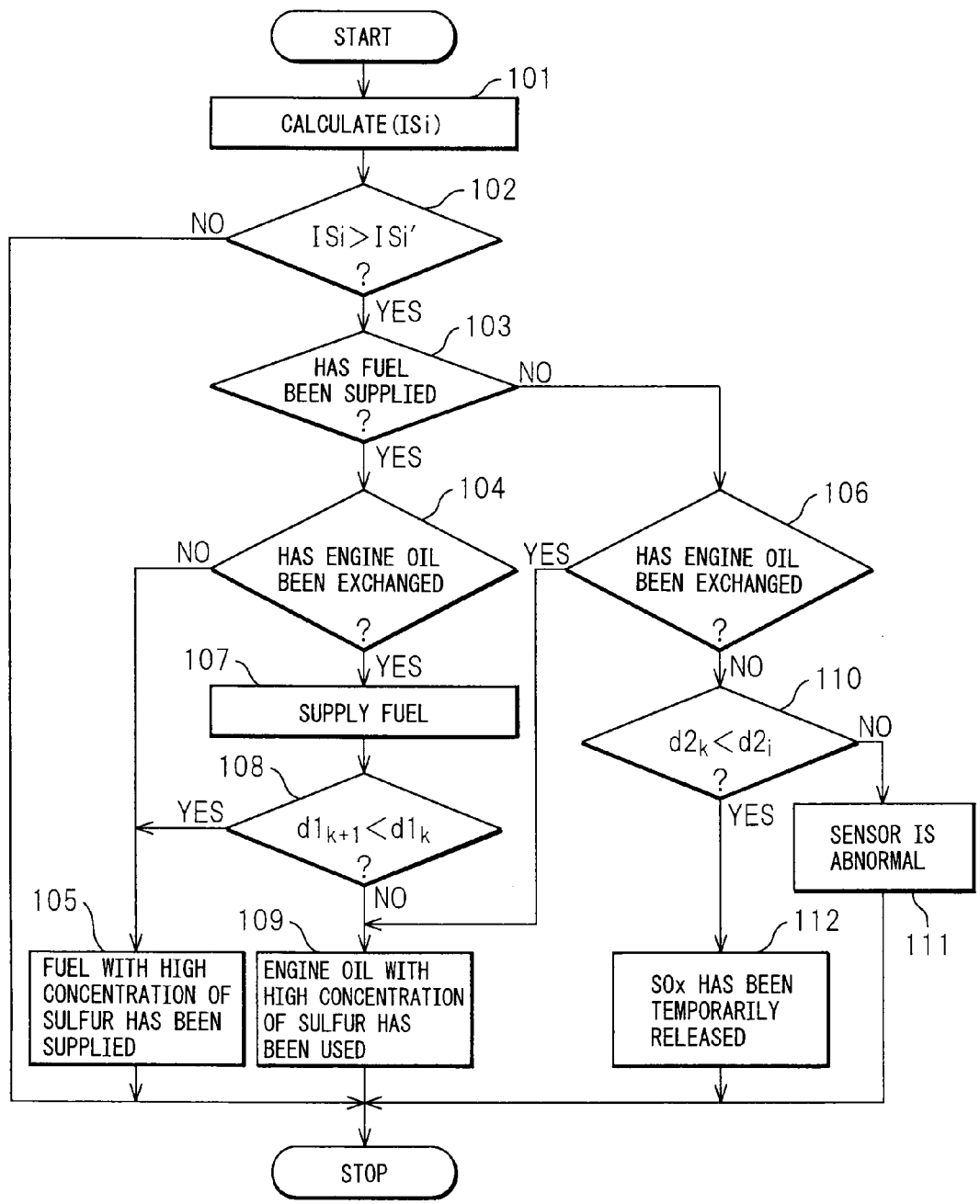
FIG. 3 is a flow chart specifying why the integrated value exceeds the allowance value.

FIG. 3 is a flow chart to specify the cause. The flow chart is repeated every calculation of an amount of $SO_X$ per a unit time passing through the S trap device 4. First, at step 101, an amount of $SO_X$ per a unit time is detected by the $SO_X$ sensor 5 and a current integrated value ($IS_i$) is calculated to integrate the amount of $SO_X$ per a unit time. Next, at step 102, it is determined if the current integrated value ($IS_i$) exceeds the current allowance value ($IS_i'$). When the result at step 102 is negative, there is no problem and the routine is finished.

On the other hand, when the result at step 102 is positive, there is a cause. In this case, an amount of $SO_X$ larger than that intended flows into the $NO_X$ storing/reducing catalyst device 3 to promote the sulfur contamination thereof. Accordingly, the cause must be specified to carry out a countermeasure if necessary. In the present flow chart, at step 103, it is determined if fuel has been supplied into the fuel tank between a first set period ago and the current time. In FIG. 2, the first set period is between a time (t0) and a current time (t1) when the integrated value (IS) shown by the dotted line exceeds the allowance value (IS') of the integrated value shown by the solid line.

When the result at step 103 is positive, at step 104, it is determined if engine oil has been exchanged between the first set period ago (t0) and the current time (t1). When the result at step 104 is negative, i.e., when between the current time (t1) and the first set period ago (t0), the fuel has been supplied into the fuel tank but the engine oil has not been exchanged, it is determined that a cause why at the current time, the integrated value ($IS_i$) of the amount of $SO_X$ exceeds the corresponding allowance value ($IS_i'$) is the fuel supply. Thus, at step 105, it is determined that because the fuel with a high concentration of sulfur is has been supplied into the fuel tank, the concentration of $SO_X$ in the exhaust gas elevates so that an amount of $SO_X$ passing through the S trap device 4 is larger than that intended. Therefore, the fuel with a high concentration of sulfur can be removed from the fuel tank if necessary, or fuel will never be supplied again in the same fuel station.

On the other hand, when the result at step 103 is negative, at step 106, it is determined if the engine oil has been exchanged between the current time (t1) and the first set period ago (t0). When the result at step 106 is positive, i.e., when between the current time (t1) and the first set period ago (t0), the fuel has not been supplied into the fuel tank but the engine oil has been exchanged, it is determined that why at the current time, the integrated value ($IS_i$) of the amount of $SO_X$ exceeds the corresponding allowance value ($IS_i'$) is the engine oil exchange. Thus, at step 109, it is determined that because the engine oil with a high concentration of sulfur is has been used, the concentration of $SO_X$ in the exhaust gas elevates so that an amount of $SO_X$ passing through the S trap device 4 is larger than that intended. Therefore, the engine oil can be exchanged to engine oil with a low concentration of sulfur if necessary.

On the other hand, when the result at step 104 is positive, i.e., when between the current time (t1) and the first set period ago (t0), the fuel has been supplied into the fuel tank and the engine oil has been exchanged, at the current time, it is not possible to specify a cause why the integrated value ($IS_i$) of the amount of $SO_X$ exceeds the corresponding allowance value ($IS_i'$). Accordingly, at step 107, at a time, fuel with a low concentration of sulfur is supplied into the fuel tank in a reliable fuel station different from the fuel station at which the fuel has been supplied at the last time. Next, at step 108, it is determined if an increase amount ($d1_{k+1}$) of the integrated value (IS) per a unit time immediately after this fuel supply is smaller than an increase amount ($d1_k$) of the integrated value (IS) per a unit time immediately before this fuel supply.

Figure 4:
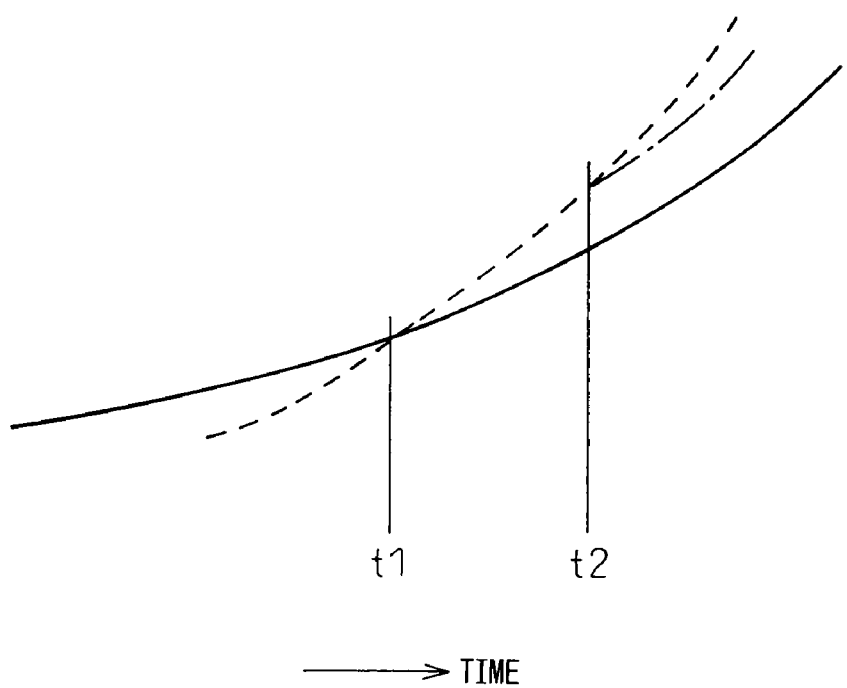
FIG. 4 is a view to explain the flow chart of FIG. 3.

In FIG. 4, when at a time (t2) after the current time (t1), the fuel with a low concentration of sulfur is supplied and as shown by a chain line, the increase amount ($d1_{k+1}$) of the integrated value (IS) per a unit time immediately after this fuel supply decreases under the increase amount ($d1_k$) of the integrated value (IS) per a unit time immediately before this fuel supply, the concentration of sulfur of the fuel in the fuel tank drops because the same engine oil is used before and after this fuel supply. Accordingly, when the result at step 108 is positive, at step 105, it is determined that the fuel with a high concentration of sulfur has been supplied into the fuel tank at the last time. Therefore, the fuel with a high concentration of sulfur can be removed from the fuel tank if necessary.

On the other hand, as shown by a dotted line, when the increase amount ($d1_{k+1}$) of the integrated value (IS) per a unit time immediately after this fuel supply does not decrease under the increase amount ($d1_k$) of the integrated value (IS) per a unit time immediately before this fuel supply, the fuel with a low concentration of sulfur has been supplied but the concentration of sulfur of the fuel in the fuel tank does not change, i.e., the fuel in the fuel tank before this fuel supply is one with a low concentration of sulfur. Accordingly, when the result at step 108 is negative, at step 109, it is determined that the engine oil with a high concentration of sulfur has been used. Therefore, the engine oil with a high concentration of sulfur can be exchanged if necessary.

On the other hand, when the result at step 106 is negative, i.e., when between the current time (t1) and the first set period ago (t0), the fuel has not been supplied and the engine oil has not been exchanged, a cause why the integrated value ($IS_i$) of the amount of $SO_X$ exceeds the corresponding allowance value ($IS_i'$) at the current time is not the fuel supply and the engine oil exchange. At step 110, it is determined if an increase amount ($d2_k$) of the integrated value (IS) per a unit time when a second set period elapses from the current time is smaller than an increase amount ($d2_i$) of the integrated value (IS) per a unit time at the current time.

Figure 5:
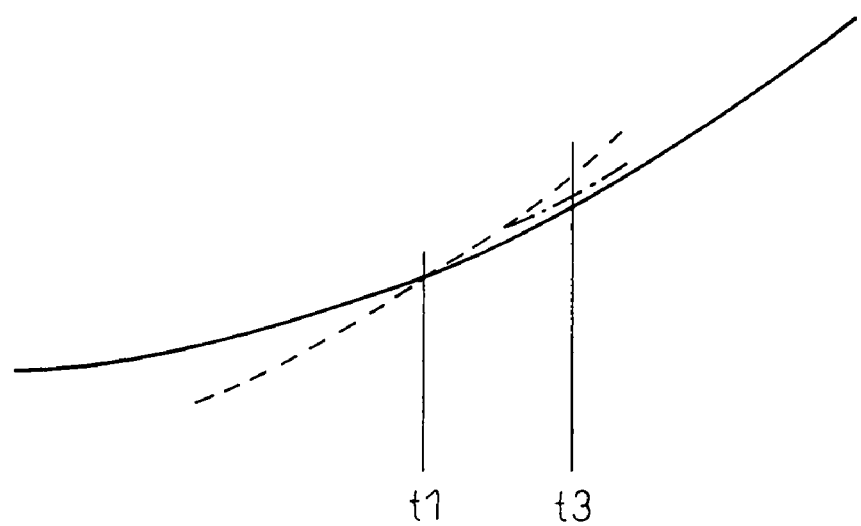
FIG. 5 is another view to explain the flow chart of FIG. 3.

In FIG. 5, at a time (t3) when the second set period elapses from the current time (t1), as shown by a chain line, when the increase amount ($d2_k$) of the integrated value (IS) per a unit time decreases under the increase amount ($d2_i$) of the integrated value (IS) per a unit time at the current time (t1), the result at step 110 is positive and at step 112, it is determined that $SO_X$ has been temporarily released from the S trap device 4 because the exhaust gas which is high temperature and rich flowed into the S trap device 4. In this case, a special countermeasure is not required.

On the other hand, as shown by a dotted line, when the increase amount ($d2_k$) of the integrated value (IS) per a unit time when the second period elapses from the current time (t1) does not decrease under the increase amount ($d2_i$) of the integrated value (IS) per a unit time at the current time (t1), the result at step 110 is negative and at step 111, it is determined that the $SO_X$ sensor 5 is abnormal. Therefore, the $SO_X$ sensor 5 can be exchanged if necessary.

In the above embodiment, the engine performs lean combustion and the $NO_X$ storing/reducing catalyst device 3 which receive a bad influence from $SO_X$ is arranged in the exhaust passage. These do not limit the present invention. In case that an engine performs stoichiometric air-fuel ratio combustion and a three-way catalyst device is arranged in the exhaust passage, the three-way catalyst device receives a bad influence from $SO_X$ and therefore it is preferable to arrange the S trap device upstream thereof. Accordingly, the present invention can be also applied to this case. Thus, the present invention can be applied to a case that the S trap device is arranged in the exhaust passage for an exhaust purification device which receives a bad influence from $SO_X$ in the exhaust gas.

In the above embodiment, the S trap device 4 is exchanged when the integrated value (IS) of the amount of $SO_X$ passing through the S trap device 4 reaches a set value (A). Therefore, a regeneration treatment in which $SO_X$ is released from the S trap device does is not required. However, this does not limit the present invention. The S trap device is not exchanged and may carry out the regeneration treatment. During the regeneration treatment, it is preferable that $SO_X$ released from the S trap device does not pass through the exhaust purification device downstream thereof and passes through a bypass passage to discharge into the atmosphere.

The invention claimed is:

1. An exhaust purification system of an internal combustion engine, comprising:
    an exhaust purification device;
    a sulfur trap device arranged upstream of the exhaust purification device; and
    an electronic control unit that includes control logic, which when executed:
        integrates an amount of $SO_X$ passing through the sulfur trap device into a current integrated value;
        sets a corresponding allowance value of the current integrated value for each elapsed period;
        determines whether the current integrated value exceeds the corresponding allowance value;
        determines whether fuel has been supplied into a fuel tank between a first set period and a current time; and
        determines whether engine oil has been exchanged between the first set period and the current time, wherein
        when the electronic control unit determines that the current integrated value exceeds the corresponding allowance value, and the electronic control unit determines that fuel has been supplied into the fuel tank and engine oil has not been exchanged between the first set period and the current time, then the electronic control unit makes the determination that fuel with a high concentration of sulfur has been supplied into the fuel tank.

2. An exhaust purification system of an internal combustion engine as set forth in claim 1, wherein when the electronic control unit determines that the current integrated value exceeds the corresponding allowance value, and the electronic control unit determines that fuel has not been supplied into the fuel tank and engine oil has been exchanged between the first set period and the current time, then the electronic control unit makes the determination that engine oil with a high concentration of sulfur has been used.

3. An exhaust purification system of an internal combustion engine as set forth in claim 1, the electronic control unit further including control logic which, when executed:
    determines whether an increased amount of the current integrated value per a unit time decreases; wherein
    when the electronic control unit determines that the current integrated value exceeds the corresponding allowance value, and the electronic control unit determines that fuel has been supplied into the fuel tank and engine oil has been exchanged between the first set period and the current time, then the electronic control unit makes the determination that fuel with a low concentration of sulfur is supplied into the fuel tank from a different fuel station when fuel is next supplied, and
    when the electronic control unit determines that the increased amount of the current integrated value per a unit time decreases after the fuel with a low concentration of sulfur is supplied, then the electronic control unit makes the determination that a fuel with a high concentration of sulfur was supplied into the fuel tank at a previous time, and
    when the electronic control unit determines that the increased amount of the current integrated value per a unit time does not decrease after the fuel with a low concentration of sulfur is supplied, then the electronic control unit makes the determination that an engine oil with a high concentration of sulfur has been used.

4. An exhaust purification system of an internal combustion engine as set forth in claim 1, the electronic control unit further including control logic which, when executed:
   determines whether an increased amount of the current integrated value per a unit time decreases between a second set period and the current time; wherein
   when the electronic control unit determines that the current integrated value exceeds the corresponding allowance value, and the electronic control unit determines that fuel has not been supplied into the fuel tank and engine oil has not been exchanged between the first set period and the current time, and
   when the electronic control unit determines that the increased amount of the current integrated value per a unit time decreases between the second set period and the current time, then the electronic control unit makes the determination that the $SO_X$ stored in the sulfur trap device has been temporarily released therefrom, and
   when the electronic control unit determines that the increased amount of the current integrated value per a unit time does not decrease between the second set period and the current time, then the electronic control unit makes the determination that a sensor for detecting an amount of $SO_X$ passing through the sulfur trap device is abnormal.

5. An exhaust purification system of an internal combustion engine as set forth in claim 2, the electronic control unit further including control logic which, when executed:
   determines whether an increased amount of the current integrated value per a unit time decreases; wherein
   when the electronic control unit determines that the current integrated value exceeds the corresponding allowance value, and the electronic control unit determines that fuel has been supplied into the fuel tank and engine oil has been exchanged between the first set period and the current time, then the electronic control unit makes the determination that fuel with a low concentration of sulfur is supplied into the fuel tank from a different fuel station when fuel is next supplied, and
   when the electronic control unit determines that the increased amount of the current integrated value per a unit time decreases after the fuel with a low concentration of sulfur is supplied, then the electronic control unit makes the determination that a fuel with a high concentration of sulfur was supplied into the fuel tank at a previous time, and
   when the electronic control unit determines that the increased amount of the current integrated value per a unit time does not decrease after the fuel with a low concentration of sulfur is supplied, then the electronic control unit makes the determination that an engine oil with a high concentration of sulfur has been used.

6. An exhaust purification system of an internal combustion engine as set forth in claim 2, the electronic control unit further including control logic which, when executed:
   determines whether an increased amount of the current integrated value per a unit time decreases between a second set period and the current time; wherein
   when the electronic control unit determines that the current integrated value exceeds the corresponding allowance value, and the electronic control unit determines that fuel has not been supplied into the fuel tank and engine oil has not been exchanged between the first set period and the current time, and
   when the electronic control unit determines that the increased amount of the current integrated value per a unit time decreases between the second set period and the current time, then the electronic control unit makes the determination that the $SO_X$ stored in the sulfur trap device has been temporarily released therefrom, and
   when the electronic control unit determines that the increased amount of the current integrated value per a unit time does not decrease between the second set period and the current time, then the electronic control unit makes the determination that a sensor for detecting an amount of $SO_X$ passing through the sulfur trap device is abnormal.

7. An exhaust purification system of an internal combustion engine as set forth in claim 3, the electronic control unit further including control logic which, when executed:
   determines whether an increased amount of the current integrated value per a unit time decreases between a second set period and the current time; wherein
   when the electronic control unit determines that the current integrated value exceeds the corresponding allowance value, and the electronic control unit determines that fuel has not been supplied into the fuel tank and engine oil has not been exchanged between the first set period and the current time, and
   when the electronic control unit determines that the increased amount of the current integrated value per a unit time decreases between the second set period and the current time, then the electronic control unit makes the determination that the $SO_X$ stored in the sulfur trap device has been temporarily released therefrom, and
   when the electronic control unit determines that the increased amount of the current integrated value per a unit time does not decrease between the second set period and the current time, then the electronic control unit makes the determination that a sensor for detecting an amount of $SO_X$ passing through the sulfur trap device is abnormal.

8. An exhaust purification system of an internal combustion engine as set forth in claim 5, the electronic control unit further including control logic which, when executed:
   determines whether an increased amount of the current integrated value per a unit time decreases between a second set period and the current time; wherein
   when the electronic control unit determines that the current integrated value exceeds the corresponding allowance value, and the electronic control unit determines that fuel has not been supplied into the fuel tank and engine oil has not been exchanged between the first set period and the current time, and
   when the electronic control unit determines that the increased amount of the current integrated value per a unit time decreases between the second set period and the current time, then the electronic control unit makes the determination that the $SO_X$ stored in the sulfur trap device has been temporarily released therefrom, and
   when the electronic control unit determines that the increased amount of the current integrated value per a unit time does not decrease between the second set period and the current time, then the electronic control unit makes the determination that a sensor for detecting an amount of $SO_X$ passing through the sulfur trap device is abnormal.

* * * * *